June 12, 1934.  W. OTTO ET AL  1,962,749
GYROSCOPIC COMPASS
Filed June 26, 1931  3 Sheets-Sheet 1

June 12, 1934.  W. OTTO ET AL  1,962,749
GYROSCOPIC COMPASS
Filed June 26, 1931  3 Sheets-Sheet 2
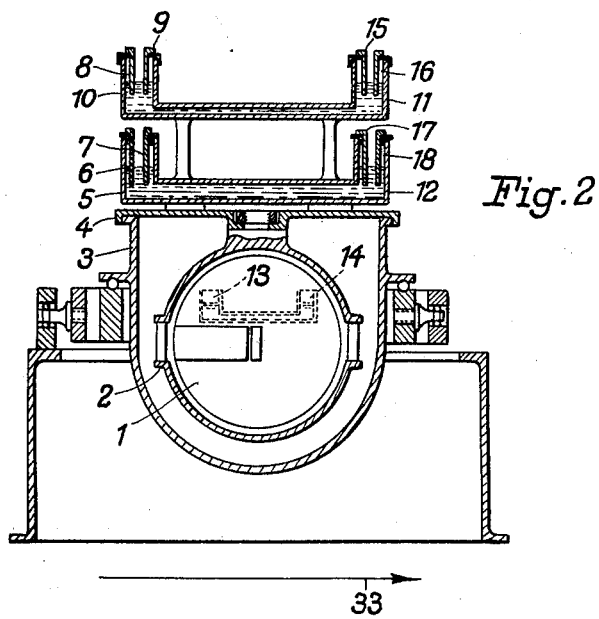
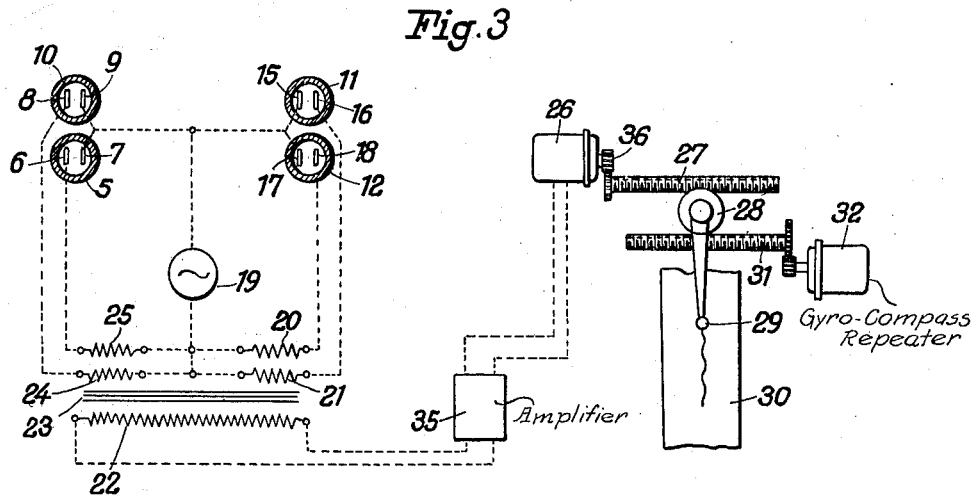

June 12, 1934.                  W. OTTO ET AL                    1,962,749
                              GYROSCOPIC COMPASS
                        Filed June 26, 1931        3 Sheets-Sheet 3

Inventors
Wolfgang Otto
and Oskar Richter
BY
Pennie, Davis, Marvin & Edmonds
ATTORNEYS.

Patented June 12, 1934

1,962,749

UNITED STATES PATENT OFFICE 1,962,749

GYROSCOPIC COMPASS

Wolfgang Otto and Oskar Richter, Neumuhlen-Kiel, Germany, assignors to Nederlandsche Technische Handel Maatschappij "Giro", The Hague, Netherlands Application June 26, 1931, Serial No. 546,969
In Germany July 3, 1930

5 Claims. (Cl. 33—226)

Our invention relates to gyroscopic compasses and, more particularly, to gyroscopic apparatus including a gyroscope carrier which tends to maintain its direction relative to the meridian.

A gyroscopic compass used in connection with the navy artillery, for instance for determining the angle of deviation, must satisfy extreme demands regarding its accuracy in operation. The slightest errors and oscillations which are negligible for purposes of navigation and will be hardly perceived in practice, may make it difficult or even impossible to measure the angle of deviation when the measurement is to be carried out during or soon after a substantial change in the course or other maneuvers.

The object of our invention is to provide means adapted to exactly detect and to determine errors in the course indication of a gyroscopic compass. Another object is the provision of means permitting of an automatic correction of the course indication given by the gyroscopic compass. Other objects will appear from the description following hereinafter.

It has been proposed heretofore to provide a device adapted to mechanically determine the error arising from the relationship of the angular movement of the vessel or other carrier of the gyroscopic compass to the earth rotation, and adapted to correct the course indication more or less automatically.

Moreover, it has been proposed to temporarily cut out the damping means of the gyroscope after a change in the course for the purpose of avoiding oscillations due to the damping effect exerted on the gyroscope carrier, compare the publication by Béghin in the French Government periodical "Annales Hydrographiques", 1921.

Both prior proposals had for their object to provide means adapted to give indication of an invariable direction and to thus permit of the above-mentioned measurement to be carried out with relation to an invariable line.

Moreover, attempts have been made to render such devices dispensable by the use of a neutrally mounted gyroscope free from any directive force in addition to, or instead of, a north-seeking gyroscope. These attempts lead to a very complicated arrangement and involve the disadvantage that a neutrally mounted gyroscope can never indicate an absolute direction in the absence of a directive force, thus requiring a permanent control based on a comparison with a gyroscopic compass or with other means for determining the direction.

The object of our invention is likewise a provision adapted to eliminate the error in the indication of the gyroscopic compass caused by the damping system and by the changing corrections of the course. For this purpose, we employ a novel principle which we have discovered and which shall be described hereinafter.

Any north-seeking gyro-compass invariably includes members responsive to an angular displacement of the direction of gravity relative to the space and adapted to cause a precession movement of the gyroscopic system in response to such a displacement. In the Anschütz compass to which our invention is applicable for instance, the center of gravity of the floating system is situated at a lower level than its center of suspension, with the result that any elevational movement of the north-south-axis will cause a precession taking place within the horizontal plane. Moreover, the compass is provided with a mass arranged to be movable in the north-south-direction and to oscillate with a certain difference in phase relative to the precessional oscillation. This mass causes, in dependence on its location, the gyroscope carrier to perform a precessional movement, that is to say, a departure from its normal position within the horizontal plane, said latter precessional movement being superimposed on the precessional movement caused by an elevation of the north-south-axis, whereby the latter precessional movement will be damped.

It is apparent, therefore, that the state of movement of the gyroscope carrier relative to the meridian, that is to say, the speed of its departure, at a given time, solely depends on the elevation of its north-south-axis relative to the horizon and on the location of the damping mass, for instance on the distribution of the damping liquid in case the mass is formed by such liquid. For sake of simplicity let it be assumed that the compass be installed on the equator so that the permanent elevation of its north-south-axis taking place in northern or southern regions need not be considered. Therefore, the elevation of the north-south-axis will amount to zero and the damping liquid will be evenly distributed and will exert no moment on the gyroscopic system when the same is in normal position and does not perform any precessional movements.

Any abnormal position of the gyroscope carrier, however, will be accompanied by a precessional movement. Thus, when the northern end of the axis is elevated, the gyroscope carrier will turn in anticlockwise direction. Similarly, a precessional movement will take place when the majority of the damping liquid is located on the southern portion of the gyroscope carrier, although the same may be horizontal. In the instance under consideration, the precessional movement would take place in clockwise direction. The velocity and the direction of the precessional movement depend at any time solely on two variable factors, namely the elevation and the distribution of the damping mass. In addition, of course, they are controlled by a number of constant factors which depend on the construction of the compass.

Our invention is based on the discovery that the two variable factors controlling the precessional movement can be measured and that such measurement permits at any time the determination of the precessional velocity of the gyroscope carrier relative to the meridian. The precessional velocity is proportional to the amount of the elevation and to the couple exerted on the gyroscope carrier by the damping mass. The knowledge of the precessional velocity at any time, however, permits the determination of the amount of the precessional movement, that is to say, the departure of the north-south-axis of the gyroscope carrier from the meridian, by way of integration with respect to the time. The integration is preferably carried out in an automatic and mechanical manner. The result so found is preferably superimposed on the indication or registration of the course which is given in the customary manner by the gyro-compass. Such corrective superposition will result in an accurate indication and/or registration of the course of the vehicle on which the gyro-compass is installed.

For a better understanding of our invention, two embodiments thereof are shown in the accompanying drawings which will be explained hereinafter:

Fig. 2 is a vertical axial section through the gyro-compass equipped with our novel means for determining the above departure;

Figure 4:
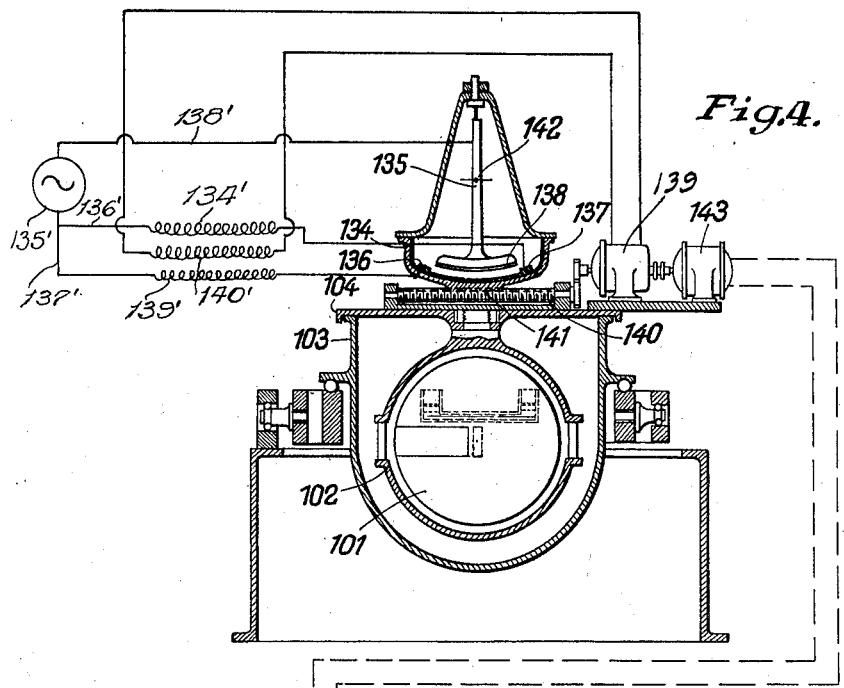
Figure 5:
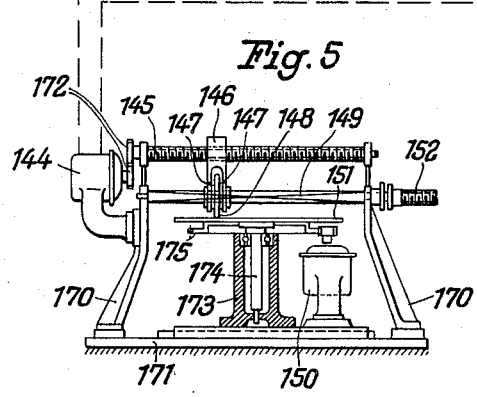
Figure 6:
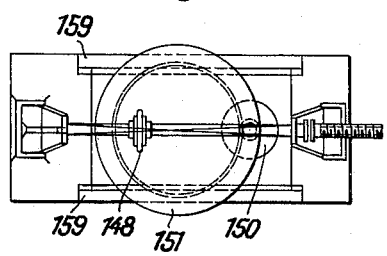

Fig. 3 shows the mechanism for superimposing the corrective movement on the course registering apparatus and the electric circuit arrangement thereof, Fig. 4 is a vertical section similar to Fig. 2 of another embodiment, Fig. 5 illustrates a preferred form of the apparatus for determining the amount of departure or error in the course indication in elevation, partial in section, Fig. 6 shows the apparatus of Fig. 5 in plan view.

With reference to Fig. 2 which illustrates a typical form of the Anschütz compass, the gyroscope carrier 1 is shown as floating freely within a surrounding spherical casing 2 carried by the cover plate 4 of a container 3 filled with liquid. The container 3 is carried by gimbal rings and is provided with electric motors controlled by the gyroscope carrier 1 and operative to turn the container 3 about the three principal axes in such a manner as to keep it in an invariable direction relative to the gyroscope carrier.

As the details of this construction are fully disclosed in Patent 1,924,688 Aug. 29, 1933, to Hermann Anschütz-Kaempfe, a detailed description thereof may be dispensed with herein. It is sufficient to state that the above-mentioned electric motors are operative to keep the cover plate 4 of the container in an invariable position relative to the horizon and to the meridian as soon as the gyro-compass has attained its normal condition in operation.

For the purposes of our invention, we have arranged two systems of communicating liquid-containers on the cover plate 4. The containers 5 and 12 are connected by a tube of comparatively large diameter whereas the containers 10 and 11 communicate by a tube of relatively small diameter or a tube provided with local restrictions of relatively small size so that the equalizing period, that is to say, the time in which upon an elevation of the compass the liquid in the communicating containers will be restored to the same level, will be the same for the containers 10 and 11 as for the damping containers 13 and 14 arranged within the gyroscope carrier 1. As the construction of the containers 13 and 14 and their arrangement within the gyroscope carrier is well-known in the art, a description thereof need not be given herein. Each of the containers 10, 11, 5 and 12 is provided in its interior with two electrodes which are insulated from each other and from the container and are immersed in the liquid as shown in Fig. 2. The electrodes are designated by the numbers 8, 9, 15, 16, 6, 7, 17 and 18. Fig. 3 in which the electrodes are shown in a plan view, illustrates the electric circuits in which the electrodes are included. A source of alternating current 19 supplies two Wheatstone-bridges. One of these bridges is comprised of fixed reactances 20 and 25 and of the ohmic resistances offered by the conductive liquid in the containers 5 and 12 to the passage of current flowing between the electrodes 6 and 7 in the one branch and the electrodes 17 and 18 in the other branch. These ohmic resistances are variable and depend on the level of the liquid in the containers. The other Wheatstone-bridge consists of the fixed reactances 21 and 24 and the variable ohmic resistances established by the conductive liquid between the electrodes 8 and 9 in the one branch and 15 and 16 in the other branch. The reactances 20, 21, 24, 25 form part of a transformer and constitute the primary windings thereof. The secondary winding of the transformer is designated by 22. All of the windings have a common iron core diagrammatically shown at 23. Shape and spacing of the electrodes, the conductivity of the liquid and the reactances are so proportioned to each other that the magnetic flux induced by the windings 20, 21, 24, 25 is directly proportional to the difference of the liquid levels from their normal position.

The electric voltage induced in the secondary winding 22 is supplied to the input circuit of an amplifier 35. The output circuit thereof supplies current to an electric motor 26 which is of the variable-speed-type, its speed being proportional to the voltage and its direction of rotation depending on the polarity of the voltage.

Thus, it will be apparent that the voltage supplied to the electric motor 26 is at any time proportional to the combined influence of the damping couple and of the elevation of the cover plate 4 or, in other terms, to the precessional velocity of the gyroscope carrier. The motor 26 is arranged to turn a threaded spindle 27 by way of a reduction gear 36. The threaded spindle 27 is journalled in stationary bearings not shown and suitably secured against longitudinal movements. Similarly, another threaded spindle 31 is carried by stationary bearings in parallel disposition with regard to spindle 27 and adapted to be driven from an electric motor 32 by a suitable reduction gearing. Carried by and in engagement with the spindles 27 and 31, there is a worm wheel 28 which carries a pointer equipped at its end with a pen. This pen is adapted to register the course of the ship on a continuously moving paper web 30 or the like. The motor 32 represents the customary driving motor of the course-registering apparatus which is under remote control by the gyro-compass so as to perform a rotation, the extent and the direction of which is proportional to the turns of the compass card relative to the ship or other vehicle, i. e. a gyro-compass repeater.

The operation is as follows:

The motor 26, the speed of which is proportional to the voltage supplied and, therefore, to the velocity of the precessional gyroscope movement, drives the threaded spindle 27 in one or the other direction at a reduced speed which is likewise proportional to differences of the liquid levels in the containers 5, 10, 11 and 12 from normal or, in other terms, proportional to the velocity of the precessional movement. For simplicity, we will at first suppose that the motor 32 is at rest. In this case, the speed at which worm wheel 28 will be turned by the revolutions of the threaded spindle 27 is proportional to the speed at which the gyroscope axis departs from its north-south-direction. Hence, the amount of the displacement of pen 29 to the right or to the left will always be proportional to the amount of the departure of the gyroscope axis from the meridian. When the motors 32 and 26 turn at the same time, the displacements which they produce on pen 29 will be superimposed on each other. It is obvious, therefore, that this differential gearing is operative to superimpose the movements imparted to the pen 29 by the motor 26 to such movements which are imparted to the pen 29 by the motor 32. If the threaded spindle 31 were kept stationary and if the course of the ship would not be changed, the pen 29 would be so adjusted by motor 26 as to truly indicate and register the departure of the gyroscope axis from the meridian at any time. The speed imparted to the pen 29 in this case would be proportional to the precessional velocity of the gyroscope carrier. Therefore, the amount of the displacement of the pen which is registered on the paper web, represents at any time the accurate departure of the gyroscope carrier from its theoretical north-south-direction. However, the threaded spindle 31 is adapted to be turned by the receiver motor 32 of the course indicator which is controlled by the gyro-compass and thus performs turns proportional to the turns of the gyroscope carrier relative to the ship about the vertical axis. The turns of the threaded spindle 27 will correctively influence the movements of the pen 29 so that the latter will register the true course of the ship on the paper web 30.

Figure 1:
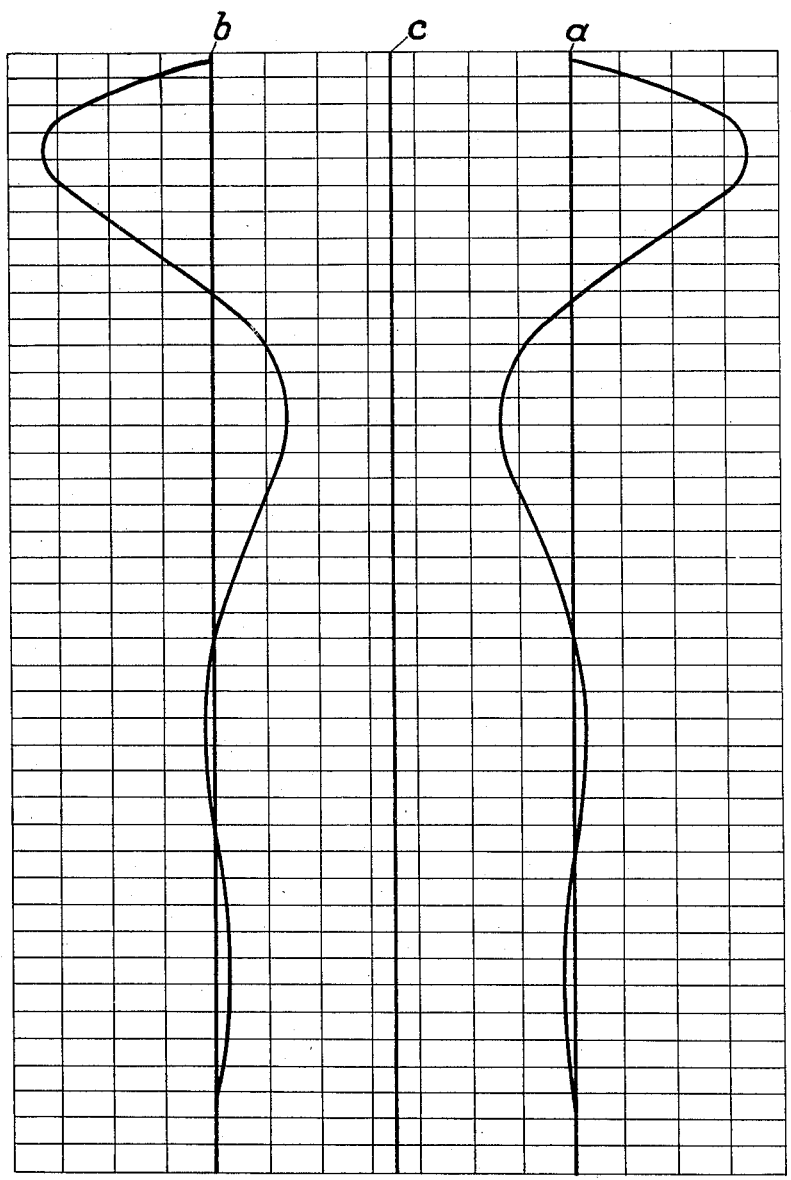
Fig. 1 shows a diagram representing the registration of the course given by the gyro-compass in the customary manner and a registration of the departure of the gyroscope axis from the meridian.

Let us assume that the ship on which the gyroscopic compass is installed be kept stationary so that changes in the course can not occur. Moreover, let it be assumed that the motor 26 be stopped so that the pen 29 is solely controlled by the electro-motor 32. In this instance, the pen will draft the curve $a$ shown in Fig. 1 representing the departure of the compass from the meridian, as will easily be appreciated.

If the motor 32, however, is stopped and the motor 26 put in operation, the departure of the compass from the meridian will be recorded in a similar manner owing to the fact that the elevation and the couple exerted by the damping mass is integrated over the time. Provided that the gearing 36 be properly selected, the recording pen 29 will so be controlled that the extent of its displacement from normal is exactly the same as that produced by motor 32, but of opposite direction and the curve $b$ will be drawn. If both motors 32 and 26 are put in action at the same time, the pen will draw the straight line $c$ which represents the true course according to the above assumption of the ship being stationary. The line $c$ represents the geometrical superposition of the displacements represented by the curves $a$ and $b$. Thus, the line $c$ is obtained if the device shown in Fig. 3 is controlled by a stationary gyro-compass. If the device, however, is installed on a travelling vehicle, for instance a ship, the line $c$ will be a curve indicating at any time the true course in dependence on the time, regardless of oscillations which the gyro-compass may make due to disturbing influences.

The arrangement shown in Fig. 2 is so provided that the liquid level in the containers 5 and 12 represents at any time the elevation of the north-south-axis of the gyroscope carrier 1 and that the motor 26 tends to displace the pen 29 at a speed which is proportional to said elevation. As the latter, however, is proportional to the precessional turn of the gyroscope carrier about the vertical axis, the motor 26 is operative to compensate the error introduced into the setting movements of motor 32 by the departure of the gyroscope carrier from its theoretical position. This is the reason why the pen 29 will always indicate and record the true course of the ship regardless of the precessional oscillations which the gyroscope carrier may make. Similarly, the resistances offered to the passage of current by the liquid in the containers 10 and 11 are so proportioned that a difference in level corresponding to the difference in levels in containers 13 and 14 tends to displace the pen 29 the same extent in opposite direction as does the level difference in containers 13 and 14 through the intermediary of the gyroscope carrier and its remote control of motor 32.

In this manner, the errors introduced by the damping mass are likewise eliminated from the indication.

Moreover, our arrangement will eliminate such errors as are due to accelerations resulting from a change of ship's speed.

For an easier understanding of the influence of an acceleration let it be assumed, that the gyro-compass has arrived at rest in normal position and that the ship be uniformly accelerated in north-south-direction, e. g. in direction of arrow 33 in Fig. 2, for a certain period of time. The result of such acceleration would be a rise of the level in container 5 and a corresponding drop of the level in container 12, the change in level corresponding to the amount of acceleration. When the acceleration ceases, the levels in containers 5 and 12 will be restored to normal because the cover plate 4 will be kept horizontal just as before. At the time when the ship has assumed its increased constant speed upon the termination of the acceleration, the motor 26 will have made a turn in a certain direction which turn corresponds to the extent and the period of the acceleration. In other words, the motor 26 is operative to produce the same ballistic deflection which corresponds to the correction required upon the termination of the acceleration. This correction has been set in the opposite sense by the receiver motor 32 so that the superposition of the setting effect performed by motor 26 will result in the correct indication of the course, provided, that the compass has the correct period of oscillation of 84 minutes, because in this case the ballistic deflection will restore the compass without oscillations to its new resting position (compare the publication "Der Kreisel" by Grammel, year 1920, page 264.)

The level in container 9 will rise a little owing to the acceleration. If the period of acceleration is short, however, the change in level will be negligible in comparison with that in container 5 because of the local restrictions provided for in the communication between containers 10 and 11. Upon termination of the acceleration, that is to say during uniform travel, the level in container 10 will not immediately but gradually be restored to normal. The effect thereof on motor 26 corresponds exactly to the opposite effect which the surplus of damping liquid in container 13 exerts on the gyroscope carrier upon termination of the acceleration. Therefore, the damping error is likewise eliminated from the indication or record made by pen 29.

The embodiment shown is capable of various modifications without departing from the spirit of our invention. If the damping means are rendered inactive during a change in the course or the speed of the ship, the containers 10 and 11 may be dispensed with, thus providing for a control of motor 26 solely by the containers 5 and 12. Similarly, it may be preferable under certain conditions to eliminate the course error by one of the known computing devices rather than by the containers 5 and 12. In this instance, the containers 10 and 11 would be retained to automatically eliminate the damping error.

An essential feature of our invention resides in that the amount of deflection of the gyroscope carrier is derived by means which will not affect the operation of the gyroscope and which are independent from turns of the ship about the vertical axis. In this regard, our invention differs from prior proposals contemplating a control of the gyroscope carrier by means exerting corrective forces thereon.

Whereas the embodiment described hereinabove involves the derivation of the gyroscope deflection from the responses of the inclinometer 5, 12 in an automatic manner, we wish it to be understood that said derivation may be carried out in any suitable way.

In Fig. 4 we have illustrated another construction of the means responsive to an elevation of the north-south-axis of the gyroscope carrier and adapted to control an integrating device by electric circuits. The spherical gyroscope carrier 101 floats freely within the surrounding casing 102 carried by the cover plate 104 of the fluid container 103 which is carried by gimbal rings and is adapted to be actuated by follow-up motors (not shown) which are operative to keep the cover plate 104 in an invariable position relative to the gyroscope carrier 101. Consequently, the cover plate 104 partakes in any elevational movements which the north-south-axis of the gyroscope carrier 101 may make owing to disturbing influences.

The inclinometer in this embodiment, that is to say, the means responsive to an elevation, is formed by a pendulum cooperating with a follow-up gear. For this purpose, a casing 134 filled with an electrically conductive liquid is suitably mounted on the cover plate 104 by brackets or standards (not shown) to be swingable about an axis which extends fore and aft as viewed in Fig. 1 and is indicated at 142. In this casing a pendulum 135 is so suspended as to be swingable within a plane extending perpendicularly to the axis 142 and in the direction of the north-south-axis of the gyroscope carrier 101. Two conductive faces 136 and 137 are so provided in the lower part of casing 134 that they are normally equally spaced from a conductive face 138 carried by the pendulum. The one terminal of a source of alternating current 135' is connected to the pendulum 135 by wire 138' and the other terminal to both faces 136 and 137 by two suitable wires 136' and 137'.

So long as the pendulum is in its normal central position, the same current will flow from the faces 136 and 137 to the pendulum 138 through each of said wires. In these wires 136' and 137' there are included two oppositely wound primary coils 134' and 139' respectively, of a transformer which has a single secondary coil 140'. With the pendulum in normal position, both coils are traversed by the same current with the result, that no E. M. F. will be induced in the secondary transformer coil. A displacement of the pendulum, however, increases the resistance offered by the conductive liquid to the passage of electric current through the one primary coil, while the resistance in the circuit of the other primary coil will be decreased. Consequently, an E. M. F. is induced in the secondary coil 140', the polarity and the voltage of which depend on the direction and extent of the pendulum displacement. The voltage of the secondary coil 140' which is amplified or not, controls a servomotor 139 in a manner known per se, driving the same in the one or the other direction. The motor 139 is arranged to rotate a worm shaft 140 engaging a worm gear segment 141 carried by the pendulum casing and adapted to turn the latter about the axis 142. Therefore, the casing 134 will be tilted by the motor 139 until it is restored to its original position relative to the pendulum 135, and until the electric equilibrium is restored between the faces 138 and 136 on the one hand and 138, 137 on the other hand. The electric motor 139 is clutched to a transmitter 143 which is connected by an electric circuit with a receiving motor 144 and controls the same in such a manner that the receiver motor 144 rotates in synchronism with the motor 139.

The receiver motor 144 shown in Fig. 5 is carried by a frame 170 mounted on a base plate 171 and is geared by pinions 172 to a threaded spindle 145 which is rotatably mounted in frame 170 and engages a threaded sleeve 146. Parallel to the spindle 145, there is journalled in frame 170 a shaft 149 of rectangular cross-section which carries a friction wheel 148. The wheel 148 is movable longitudinally and secured against relative rotation on shaft 149. The hub of the friction wheel 148 is provided with two peripheral grooves which are engaged by two forks 147 which depend from the threaded sleeve 146. The base plate 171 carries a hollow standard 173 accommodating antifriction bearings for a vertical shaft 174 of a horizontal turn table 151. A spring (not shown) tends to lift the shaft 174 and to keep the turn table 151 in frictional engagement with the wheel 148. The table carries a toothed rim 175 which is in mesh with the driving pinion of an electric motor 150. The motor 150 is driven at an invariable speed during operation. The shaft 149 is clutched to a threaded spindle 152 which corresponds to the threaded spindle 27 in Fig. 3 and performs the same function. For sake of simplicity, the elements 31, 32 and 28 are omitted in this figure. It is to be understood, however, that the threaded spindle 152 controls the recording pen in cooperation with another threaded spindle geared to a receiver motor such as 32.

The operation is as follows:

The electric control of motor 139 by the conductive faces 138, 136 and 137 functions to turn motor 139 in response to a displacement of pendulum 135 through an angle which is exactly proportional to the pendulum displacement from normal and to the elevation of the gyroscope carrier relative to the apparent horizon.

The receiver motor 144 turns spindle 145 through a proportional angle and thus causes a displacement of the threaded sleeve 146 which is proportional again to said elevation. Initially, the apparatus is so set that the frictional wheel 148 contacts with the center of the turn table 151 when the pendulum 135 is in its normal position and when the gyroscope carrier 101 has swung into the meridian.

As soon as the gyroscope carrier 101 is given an elevation relative to the apparent horizon, the casing 102 and the cover plate 104 will automatically follow the gyroscope carrier 101 and will thus assume a similar angular position relative to the horizon. Therefore, the pendulum 135 swings relative to the cover plate 104 through an angle which casing 134 will immediately be turned by motor 139. The threaded sleeve 146 will be displaced an extent proportional to said angle and will thus remove the frictional wheel 148 from the center of the turn table 151 rotating at constant speed. Therefore, the friction wheel 148 will be rotated at a speed which is proportional to its distance from the turn table center or, in other terms, proportional to the amount of the elevation. This elevation, however, is proportional to the precessional speed at which the north-south-axis of the gyroscope carrier is deflected from the meridian, provided, that no consideration is given to the influence of the damping mass on the precessional movement. Thus, the recording pen (not shown in this figure) will be controlled and adjusted in substantially the same manner as described in connection with Fig. 3.

The mechanism illustrated in Figs. 5 and 6 represents a device adapted to mechanically integrate the speed of motor 144 over time so that the turn imparted to the threaded spindle 152 will be at any time proportional to the deflection of the gyroscope axis.

The inclinometer shown in Fig. 4 will give a very accurate measurement of the elevation of the gyroscope carrier relative to the apparent horizon and from a certain aspect of our invention, may be employed in connection with integrating devices other than that shown in Fig. 5.

What we claim is:—

1. In a gyro-compass the combination comprising a north-seeking gyroscope carrier, a gravity-responsive inclinometer controlled by said carrier and adapted to detect alterations of the apparent direction of gravity relative to said carrier, integrating means controlled by said inclinometer, and means controlled by said integrating means and adapted to indicate the integration of said alterations with respect to the time.

2. In a gyro-compass the combination comprising a north-seeking gyroscope carrier, a movable mass coordinated to said carrier and adapted to exert a damping couple thereon, a second mass arranged for movement substantially corresponding to the movement of said first-mentioned mass, an integrating mechanism controlled by said second mass and adapted to integrate the amount of said damping couple with respect to the time, and means controlled by said integrating mechanism for indicating the result of the integration.

3. In a gyro-compass the combination comprising a north-seeking gyroscope carrier, a movable mass coordinated to said carrier for exerting a variable damping couple thereon, a receiver motor controlled by said carrier for movement in synchronism therewith, means coordinated to said carrier and responsive to forces causing the gyroscope carrier to perform a precessional departure from the meridian, an electric motor controlled by said means to rotate at a speed proportional to the amount of said forces, a differential gearing driven by said electric motor and by said receiver motor, and an indicator actuated by said differential gearing.

4. In a gyro-compass the combination comprising a north-seeking gyroscope carrier, a base plate adapted to maintain an invariable position relative to said carrier, a casing pivotally mounted on said base plate to swing about an axis perpendicular to the meridional plane of said carrier, a pendulum arranged in said casing and swingable in said plane, an electric motor controlled by said pendulum and adapted to angularly adjust said casing and to restore the same to a predetermined position relative to said pendulum, and a course-indicator controlled by said gyroscope carrier and by said electric motor.

5. In a gyro-compass the combination comprising a north-seeking gyroscope carrier, a direction indicator controlled by said carrier, means coordinated with said carrier and responsive to forces causing said carrier to perform a precessional departure from the meridian, an electric motor controlled by said means to perform a movement proportional to the combined amount of said forces and to the speed of said precessional departure, a turn table rotating at an invariable speed, a friction wheel in engagement with said turn table, means controlled by said electric motor to radially displace said friction wheel on said turn table, and a cooperative connection between said friction wheel and said indicator.

WOLFGANG OTTO.
OSKAR RICHTER.